Figure 1:
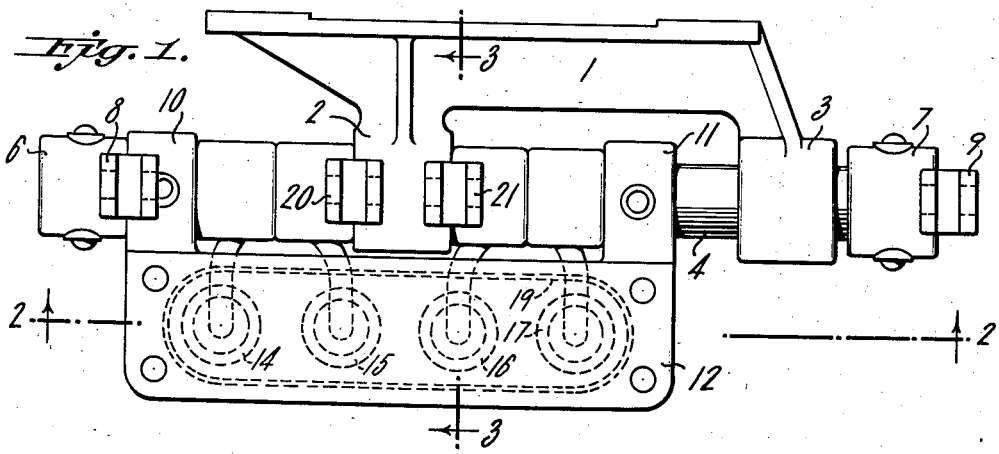

April 6, 1937.  S. H. BRODHEAD ET AL  2,075,974

BRAKE EQUALIZER

Filed Feb. 27, 1936

INVENTORS
STUYVESANT H. BRODHEAD
WILLIAM O. TAIT, JR.
BY
ATTORNEY.

Patented Apr. 6, 1937

2,075,974

UNITED STATES PATENT OFFICE 2,075,974

BRAKE EQUALIZER

Stuyvesant H. Brodhead and William O. Tait, Jr., Mamaroneck, N. Y.

Application February 27, 1936, Serial No. 65,970

6 Claims. (Cl. 188—204)

This invention relates to brake equalizing systems in vehicles having mechanical brakes, and more particularly to a fluid type equalizer in which operating pressure is exerted upon a body of fluid and is transmitted thereby to the several brake actuating members in equal degree.

The chief disadvantage of mechanical brake systems heretofore has been, first, the difficulty of adjusting the several brakes to provide an even distribution of operating pressure upon the brakes, and second, the tendency to quickly fall out of equal adjustment under normal operating conditions. The uneven braking action causes disproportionate tire wear and also greatly increases the danger of skidding when traveling on wet or icy road surfaces. The device herein disclosed will transmit equal pressure to all brake operating members and will automatically compensate for any subsequently occurring variations in the brake system. The necessity of fluid-tight joints or packings is eliminated by the special construction shown and in the remote event of fluid loss a mechanical connection is established which will transmit braking force.

An object of this invention is, therefore, to provide a fluid type equalizer for brakes which is more positive in operation and simple in construction.

Another object is to provide a fluid equalizer which is more readily installed and requires a minimum of maintenance.

Still another object is to provide a fluid equalizer which is free from seepage and loss of contained fluid.

A further object is to provide a fluid equalizer for brakes which establishes a mechanical connection in event of failure of the equalizer to properly function.

Figure 2:
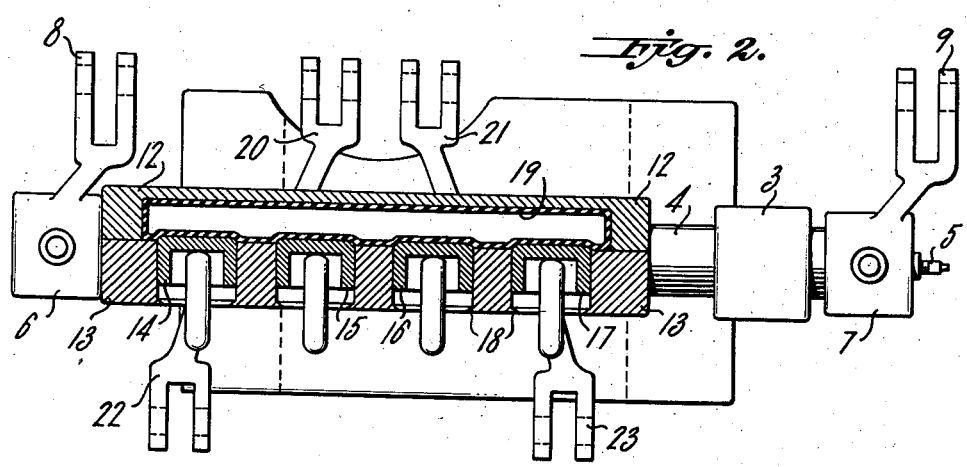
Figure 3:
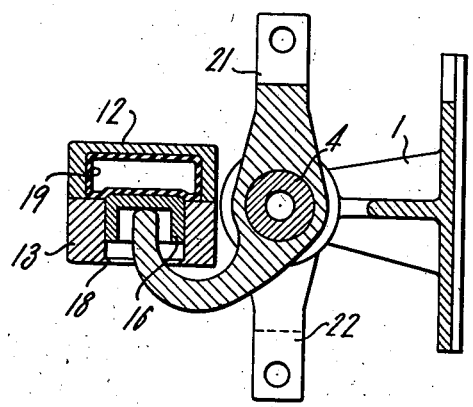

Other objects and advantages will in part be specifically stated and in part be obvious when the following specification is read in connection with the drawing, in which:

Fig. 1 is a top plan view of the equalizer as installed; Fig. 2 is a section taken on line 2—2 of Fig. 1; and Fig. 3 is a section taken on line 3—3 of Fig. 1.

While the particular embodiment of the invention shown and described is especially applicable to Ford automobiles of recent models, the invention is not limited to vehicles in general or to any particular type of vehicle.

Referring in more detail to Fig. 1, the numeral 1 represents a mounting bracket which may be attached to a transverse member of an automobile frame (not shown). The bracket 1 is provided with bearings 2 and 3 in which is journaled a rock shaft 4. A lubricating nipple 5 (Fig. 2) on the end of the rock shaft communicates with a channel therein by which grease is conveyed to the bearings. At either end of the rock shaft 4 are fixed collars 6 and 7 having associated clevis members 8 and 9 intended for respective connection with a hand brake lever and a foot pedal, not shown. The equalizing member is fixedly attached to the rock shaft 4 by means of sleeves 10 and 11 and, as shown in Fig. 2, comprises a head 12 and a block 13 bolted together or otherwise suitably secured. The block 13 is bored to slidably receive four pistons 14, 15, 16 and 17, and at the bottom of each bore a feather 18 is provided to act as a limit stop for the pistons. The interior face of the head 12 is counterbored to provide a chamber overlying the pistons. In the preferred form of the invention this chamber contains a flexible sack 19 which is filled with a fluid and sealed. An alternative construction is to secure a flexible sheet or membrane over the open side of the chamber which is then filled with fluid. Bearing against the underside of the pistons are four bell crank levers rotatably mounted on the rock shaft 4. The two upwardly extending levers 20 and 21 connect with the rear brake rods, not shown, and the two downwardly extending levers 22 and 23 connect with the front brake rods.

The operation of the device is as follows. When either the foot brake or the hand brake of the automobile is actuated, the rock shaft 4 is tilted and the attached equalizer swings downwardly against the resistance of the pistons. This action applies pressure to the fluid in the sack 19 which pressure is distributed to the four pistons in proportion to their unit surface area and thence to their associated brakes by way of the bell crank levers. If the brake rods are of unequal lengths or other maladjustment of the brakes exists, the pistons will stand at different heights in the bores. The flexible sack 19 accommodates itself to these irregularities, however, and even pressure is applied as before. The fluid sack 19 may be of molded rubber or other impervious material and may be replaced when needed. The sack eliminates the need for fluid-tight joints, seals, and packing, and thereby allows a more economical and efficient construction of the device. If for any reason the sack breaks, permitting escape of the contained fluid, the device sinks down until the lower portion of block 13 comes in contact with the curve of the bell crank levers as will be apparent from Fig. 3. Any braking force will then be transmitted through this contact to the brakes. The travel of the pistons is so small that the flexible sack 19 can readily accommodate itself to any variations in position that may occur even if one or more brakes be disconnected from the pistons.

It will be apparent that many modifications and changes may be made in the device by anyone skilled in the art without departing from the spirit and scope of the invention as set forth in the following claims.

We claim:—

1. In a fluid equalizer for mechanical brakes, a support, a rock shaft tiltably mounted on said support, a casing fixedly attached to said rock shaft and extending parallel thereto, a body of fluid contained in said casing, a plurality of bell crank levers pivotally carried by said rock shaft, brake connection means at one end of each of said levers, means for tilting said rock shaft and applying pressure on said fluid, and means for transmitting pressure from said fluid to the other end of each bell crank lever.

2. In a fluid equalizer for mechanical brakes, a support, a rock shaft tiltably mounted on said support, a casing fixedly attached to said rock shaft and extending parallel thereto, a body of fluid contained in said casing, a plurality of pistons mounted in said casing adjacent said body of fluid, a plurality of bell crank levers pivotally carried by said rock shaft, brake connection means at one end of each of said levers, means for tilting said rock shaft and applying pressure to said fluid against the resistance of said pistons, and means transmitting the resulting motion of said pistons to the opposite ends of said levers.

3. In a fluid equalizer for mechanical brakes, a support, a rock shaft tiltably mounted on said support, a casing fixedly attached to said rock shaft and extending parallel thereto, a body of fluid contained in said casing, a plurality of pistons mounted in said casing adjacent said body of fluid, a plurality of bell crank levers pivotally carried by said rock shaft, brake connection means at one end of each of said levers, a driving contact between the opposite end of each lever and an individual piston, and means for tilting said rock shaft and applying pressure to said fluid, whereby the resultant motion of said pistons is applied to said levers.

4. In brake mechanism for vehicles comprising an operating member and a plurality of brake actuating members operative thereby, a rigid shaft having means for rotatably mounting it in the vehicle, means for connecting the operating member to said shaft for rotating it, a casing connected to said shaft to rotate therewith and having a row of intercommunicating cylinders therein, said casing containing a fluid, a row of bell-crank levers mounted on said shaft to rotate independently, an arm of each of said levers having means for connecting it to a brake actuating member, and a piston on the other arm of each bell-crank lever, said pistons being subject in common to pressure applied to the fluid in said fluid containing member.

5. In brake mechanism for vehicles comprising an operating member and a plurality of brake actuating members operative thereby, a rigid shaft having means for rotatably mounting it in the vehicle, means for connecting the operating member to said shaft for rotating it, a casing having arms at its ends fixed to said shaft to rotate therewith and having a row of intercommunicating cylinders therein, said casing containing a fluid, a row of bell-crank levers mounted on said shaft between said arms on said casing to rotate independently, an arm of each of said levers having means for connecting it to a brake actuating member, and a piston on the other arm of each bell-crank lever, said pistons being subject in common to pressure applied to the fluid in said fluid containing member.

6. In a brake mechanism for vehicles comprising an operating member and a plurality of brake actuating members operative thereby, a rigid shaft having means for rotatably mounting it in the vehicle, means for connecting the operating member to said shaft for rotating it, a casing connected to said shaft to rotate therewith and having a row of cylinders formed therein and an intercommunicating passageway of a width substantially equal to the diameter of said cylinders and connecting them at their inner ends, a body of relatively heavy viscous fluid contained in said casing, a row of equalizing levers mounted on said shaft to rotate independently thereon, said levers having means for connecting them to the respective brake actuating members, and pistons on said levers operative in the respective cylinders in said casing and subject in common to pressure applied to the fluid thereon by rotation of said shaft.

STUYVESANT H. BRODHEAD.
WILLIAM O. TAIT, Jr.